(12) United States Patent
Jeschke

(10) Patent No.: US 6,969,556 B2
(45) Date of Patent: *Nov. 29, 2005

(54) FILMS, COMPOSITIONS AND PROCESSES

(75) Inventor: Michael Jeschke, Cumbria (GB)

(73) Assignee: UCB, S.A., Brussels (BE)

( * ) Notice: Subject to any disclaimer, the term of this patent is extended or adjusted under 35 U.S.C. 154(b) by 0 days.

This patent is subject to a terminal disclaimer.

(21) Appl. No.: 10/415,111

(22) PCT Filed: Oct. 17, 2001

(86) PCT No.: PCT/EP01/12019

§ 371 (c)(1),
(2), (4) Date: Jan. 26, 2004

(87) PCT Pub. No.: WO02/34803

PCT Pub. Date: May 2, 2002

(65) Prior Publication Data

US 2004/0143070 A1 Jul. 22, 2004

(30) Foreign Application Priority Data

Oct. 25, 2000 (GB) .............................................. 0026055

(51) Int. Cl.$^7$ .............................................. B32B 27/08
(52) U.S. Cl. .................. 428/515; 428/516; 264/173.15; 264/173.19; 52/477
(58) Field of Search ................................ 428/515, 516; 264/173.15, 173.19; 52/477

(56) References Cited

U.S. PATENT DOCUMENTS 4,514,534 A * 4/1985 DiNardo ..................... 524/108
4,786,533 A * 11/1988 Crass et al. .................... 428/13
5,543,454 A    8/1996 Kamakura et al.
2004/0143070 A1 * 7/2004 Jeschke ....................... 525/216

FOREIGN PATENT DOCUMENTS

| EP | 0826728 | 3/1998 |
|----|---------|--------|
| EP | 0903356 | 3/1999 |

OTHER PUBLICATIONS

Classes of Nucleating Agents: http://www.specialchem4polymers.com/tc/nucleators/index.asp?id=classes (undated).*

* cited by examiner

Primary Examiner—Ieszek B Kiliman
(74) Attorney, Agent, or Firm—Wenderoth, Lind & Ponack, L.L.P.

(57) ABSTRACT

There is described a substantially planar, self supporting, sheet or film (optionally oriented) which comprises at least one layer comprising a first material which is very highly crystalline polymer (preferably polypropylene of 99% or greater isotacity) together with at least one second material in an amount sufficient to improve one or more of the barrier properties, mechanical properties and/or optical properties of the sheet. The second material comprises a (a) nucleating agent; (b) a polymeric material having a ring and ball softening point from about 110° C. to about 170° C. and/or (c) a hydrogenated resin such as dicyclopentadiene hydrogenated resin, a hydrogenated mixed monomer resin; and/or a resin obtainable from a mixture of a-methyl styrene, indene and/or vinyl toluene monomers. Processes for making such films and compositions for use in the process are also described. Such films are useful in shrink wrap applications for example wrapping tobacco products.

15 Claims, 4 Drawing Sheets

FILMS, COMPOSITIONS AND PROCESSES

Figure 1:
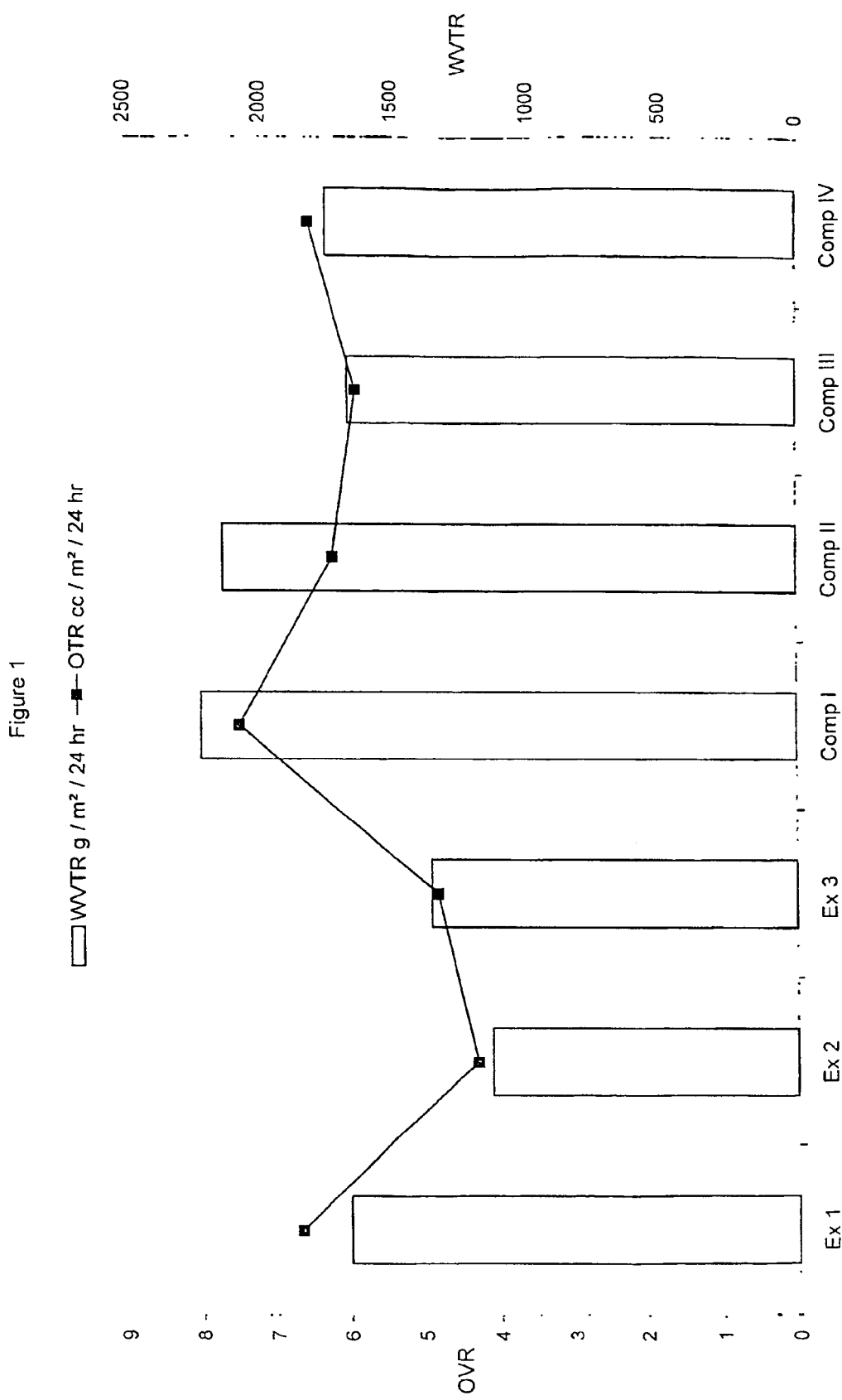

The present invention relates to improvements in oriented sheet-like materials such as polymeric films.

Sheet-like materials (which include films) are often used in applications where they are applied to an article, e.g. as packaging, and then are shrunk to more closely fit that article. Such shrinkable films are useful to provide a tamper evident seal and gaseous and/or moisture barrier to protect and surround the article to which they are applied. In a optional object of the present invention it would be desirable to provide improved sheets (optionally with improved % shrinkage) suitable for use in such applications.

Various films have been developed which comprise high crystallinity polypropylene (HCPP) with a large degree of intermolecular stereoregularity. HCPP typically comprises from 94 to 98% of isotactic polymer the remainder being atactic polymer. HCPP exhibits higher crystallinity than conventional less crystalline polymers which results in films having higher stiffness, surface hardness, lower deflection at higher temperatures and better creep properties. Further information relating to HCPP, including methods for preparation of the resin is disclosed in U.S. Pat. No. 5,063,264. Commercially available sources of HCPP resins suitable for preparing films include Amoco 9117 and Amoco 9119, available from Amoco Chemical Co. of Chicago, Ill.; Chisso HF5010 and Chisso XF2805, available from Chisso Chemical Co., Ltd. of Tokyo, Japan. Suitable HCPPs are also available from Solvay in Europe.

The present invention relates to films comprising very high crystallinity polypropylene homopolymer (referred to herein as VHCPP) which is polypropylene homopolymer with a very high intermolecular stereoregularity. VHCPP consists of at least about 98% of isotactic polymer the remainder (if any) being atactic polymer. However it had previously been thought that there were great difficulties in making stretched oriented films from extremely crystalline polymers such as VHCPP because of processing problems encountered when making films with such polymers.

Intermolecular stereoregularity can be determined by IR spectroscopy according to the procedure set out in "Integrated Infrared Band Intensity Measurement of Stereoregularity in Polypropylene," J. L. Koenig and A. Van Roggen, Journal of Applied Polymer Science, Vol. 9, pp. 359–367 (1965) and in Chemical Microstructure of Polymer Chains, Jack L. Koenig, Wiley-Interscience Publication, John Wiley and Sons, New York, Chichester, Brisbane, Toronto. Intermolecular stereoregularity can also be determined by decalin solubility and NMR.

Various patents are known which describe films made from highly isotactic polypropylene to which various additives have been added.

EP 0634455 (Mitsui) describes a polypropylene films comprising a crystalline polypropylene (HCPP) having a stereoregularity as defined by a specific NMR spectrum together with a terpene resin having no polar group and a petroleum resin having no polar group.

WO 9641718 (Mobil) relates to a polymeric film having improved moisture barrier characteristics. The film includes a base layer of a high crystallinity polypropylene having an isotactic stereoregularity greater than 93% and a resin modifier in an amount up to 8% by weight of the base layer.

U.S. Pat. No. 5,500,282 (Mobil) describes a biaxially oriented film structure of improved water vapour transmission rate comprising an extruded and stretched mixture of (1) high crystallinity polypropylene (HCPP) having intermolecular stereoregularity greater than 93% and (2) a moisture barrier improving amount of polyterpene resin.

U.S. Pat. No. 3,278,646 (Lambert) and U.S. Pat. No. 4,230,767 (Isaka) disclose oriented polypropylene films which contain terpene polymer which is primarily added to improve heat seal properties.

U.S. Pat. No. 3,937,762 (Nahmias) disclose a resinous blend composition for films comprising a polypropylene containing a minor amount of terpene, e.g., alpha-pinene, beta-pinene or beta-phellandrene.

U.S. Pat. No. 5,128,183 (Buzio) discloses films comprising a mixture of: isotactic polypropylene; high density polyethylene; and a glassy, amorphous low molecular weight resin, e.g. terpene polymers. The resin is added at levels above 5% by weight to exert a compatibilising effect on the blend of polypropylene and polyethylene providing a transparent film. The polyethylene component is added to facilitate mixing and homogeneity of the product.

U.S. Pat. No. 5,579,913 (Yamada) describes films which comprise polypropylene resins of high stereoregularity (defined by various ratios of relative peak height in its $C^{13}$ NMR spectrum) with a non polar terpene resin and/or a petroleum resin.

It is known to add terpene polymers to certain polypropylenes for the purpose of improving heat seal, their use for improving moisture barrier characteristics in conventional OPP films has required relatively large amounts, say, 3 to 25% w/w, in order to be effective.

JP 04-A-336136 (Chisso Corp), [CAS 118:193369] discloses films from 100 parts crystalline polypropylene to 20–40 parts cyclopentadiene type petroleum resins such as DCPD.

U.S. Pat. No. 4,603,174 [=EP 0148621-B—(Sumitomo)] describes stretched films of good transparency made from conventional polypropylene which further comprise, as an additive, 0.05 ppm to 10,000 ppm of a polypropylene copolymer with 3-position branched α-olefins and/or a vinyl cycloalkanes each having at least 6 carbon atoms.

U.S. Pat. No. 5,556,920 (Tanka) describes stretched films of good transparency made from crystalline polypropylene which further comprise, as an additive, 0.1 ppm to 1,000 ppm of a monocyclic α-olefin polymer.

None of the preceding references teach that additives could be used with VHCPP to produce films with the advantageous properties as described herein, nor do they suggest how the processing difficulties with VHCPP may be overcome.

VHCPP has previously been used to manufacture cast film, but it has not been used to prepare stretched (i.e. oriented) films. This is because it had been believed there was a practical upper limit on the crystallinity of a polymer which could be processed using the conventional manufacturing processes for orienting polyolefinic films. Films comprising highly crystalline nucleated polymers (such as HCPP) crystallise very rapidly after orientation and form very stiff films and because of this it had been thought that it was too difficult to control the process to obtain the desired properties in the final film. For example it has been found that such films are incompatible with equipment such as a chill roll conventionally used to cool a sheet after stretching on a stenter frame. If the temperature is sufficiently hot to allow the stiff sheet to cool sufficiently slowly it is found the sheet becomes too thick to be easily processed (e.g. incompatible with the clips on a stenter frame). This experience would lead a skilled person to predict that it would be very difficult to obtain an oriented film from a combination of a VHCPP with a nucleating agent as it would be thought that such a combination would be likely to cause many problems during the processing stages of film manufacture.

The applicant has now surprisingly discovered that polymers of extremely high crystallinity (such as VHCPP) can be used in combination with a nucleating agent and/or hard resin to make oriented films for example when the films are prepared using the improved processes described herein. Films comprising such extremely crystalline polymers have been found to exhibit improved properties to an unexpected degree when used in combination with certain other additives.

It is a preferred object of the present invention to provide a sheet which exhibits improved properties in one or more of the following areas: high moisture barrier; flexural stiffness; Young's modulus; heat sealability; coatability; improved oxygen barrier, flavour and/or aroma protection; and/or machinability and/or applicability to high speed horizontal form and/or fill applications.

The applicant has found a sheets, polymer compositions and processes for preparing the sheets which address some or all of the problems described herein.

Broadly in accordance with one aspect of the present invention there is provided a substantially planar, self supporting sheet which comprises at least one layer comprising a first material which is very highly crystalline polymer together with at least one second material in an amount sufficient to improve one or more of the barrier properties, mechanical properties and/or optical properties of the sheet.

Broadly in accordance with another aspect of the present invention there is provided a substantially planar self supporting sheet which comprises at least one layer comprising a mixture of a first material which is very highly crystalline polymer together with at least one second material which comprises a polymeric material having a ring and ball softening point from about 110° C. to about 170° C. and/or a nucleating agent.

Broadly in accordance with another aspect of the present invention there is provided a substantially planar self supporting sheet which comprises at least one layer comprising a mixture of a first material which is very highly crystalline polymer together with at least two second materials comprising hydrogenated hydrocarbon resin(s) of different types and/or nucleating agent(s).

Preferred sheets of the invention are oriented in at least one preferably two directions.

Preferred sheets of the invention exhibit one or more, more preferably two or more, improved properties selected from barrier properties, mechanical properties and/or optical properties; more preferably water vapour transmission rate (WVTR), oxygen transmission rate (OTR); Young's modulus; flexural modulus; tensile strength; haze and/or clarity. Such improvements are measured with respect to an otherwise identical sheet in which the VHCPP component is substituted by HCPP.

Advantageously sheets of the present invention may exhibit one or more (more advantageously two or more) of the following properties measured in any direction parallel to the sheet surface and where necessary normalised for a 20 micron thick film:

a low water vapour transmission rate (WVTR), preferably less than about 6 g/24 hours/m$^2$; more preferably from about 3 g/24 hours/m$^2$ to about 6 g/24 hours/m$^2$;

a low oxygen transmission rate (OTR), preferably less than about 1,500 cm$^3$/24 hours/m$^2$; more preferably less than about 1,300 cm$^3$/24 hours/m$^2$; most preferably less than about 1,100 cm$^3$/24 hours/m$^2$;

a high Young's modulus, preferably from about 4000 MPa to about 5000 MPa, most preferably about 4500 MPa;

a high flexural modulus preferably from about 0.4 N(mm)$^2$ to about 0.7 N(mm)$^2$; more preferably from about 0.5 N(mm)$^2$ to about 0.7 N(mm)$^2$;

a high tensile strength preferably greater than about 200 MPa;

a haze less than about 1.1%; and/or a clarity greater that about 97%.

Unless otherwise specified the following test methods were used herein:

WVTR was measured at 38° C. and 90% relative humidity (RH) in units of g/24 hours/m$^2$; as described in standard method DIN 53122.

OTR was measured at 38° C. and 0% relative humidity (RH) in units of cm$^3$/24 hours/m$^2$, as described in standard method AST D1432.

Young's modulus was measured in units of MPa, as described in standard method ASTM D882.

Flexural modulus was measured in units of N(mm)$^2$, as described in standard method BS 2782 part 3, method 332A, 1976.

Film tensile strength was measured in units of MPa, using any standard method such as those as described in BS 2782, ASTM D882 and/or DIN 53455.

Haze was measured as described in standard method ASTM D1003.

Clarity was measured as described in standard method ASTM D1746.

A yet further aspect of the present invention provides a composition comprising a first material of a very highly crystalline polymer together with at least one second material in an amount sufficient to improve one or more of the barrier properties, mechanical properties and/or optical properties of a sheet made from the composition; with the proviso that when the first material is a 98% to 99% isotactic VHCPP, the second material is other than 0.2% of a dibenzylidene sorbitol nucleating agent.

A yet further aspect of the present invention provides a composition comprising a first material of a very highly crystalline polymer together with at least one second material which comprises a polymeric material having a ring and ball softening point from about 110° C. to about 170° C. and/or a nucleating agent; with the proviso that when the first material is a 98% to 99% isotactic VHCPP, the second material is other than 0.2% of a dibenzylidene sorbitol nucleating agent.

A yet still further aspect of the present invention provides a composition comprising a first material of a very highly crystalline polymer together with at least two second materials which are hydrogenated hydrocarbon resin(s) of different types and/or nucleating agent(s).

Still another aspect of the invention provides a process for preparing a substantially planar oriented sheet comprising the steps of:

(a) forming a polymer composition from a first material of very highly crystalline polymer and a second material in an amount sufficient to improve the water vapour barrier, Young modulus and/or, flexural stiffness properties of the sheet;

(b) forming a self supporting sheet from the polymer composition; and (c) heating and stretching the sheet in at least one direction to orient the sheet.

Yet still another aspect of the invention provides a process for preparing a substantially planar sheet comprising the steps of:

(a) forming a polymer composition from a mixture of a first material of a very highly crystalline polymer together with at least one second material which comprises a polymeric material having a ring and ball softening point from about 110° C. to about 170° C. and/or a nucleating agent; by mixing together the first and second materials in a suitable manner (b) forming a self supporting sheet from the polymer composition; and (c) optionally heating and stretching the sheet in at least one direction to orient the sheet.

A still further aspect of the invention provides a process for preparing a substantially planar oriented sheet comprising the steps of:

(a) forming a polymer composition from a mixture of a first material of a very highly crystalline polymer together with at least two second materials which are hydrogenated hydrocarbon resins of different types and/or nucleating agent(s); by mixing together the ingredients in a suitable manner;

(b) forming a self supporting sheet from the polymer composition; and (c) optionally heating and stretching the sheet in at least one direction to orient the sheet.

Preferably in the process the sheet is formed in a continuous web.

Preferably the composition formed in step (a) comprises a composition of the invention as described herein.

It will be appreciated that in step (b) the sheet may be formed by any suitable technique known to those skilled in the art such as by any extrusion and/or co-extrusion process (es) and preferably by extrusion of the polymer composition for example through a suitable (e.g. slit or annular) die.

After extrusion of a sheet web by conventional extrusion techniques, the sheet web may be heated and molecularly oriented by stretching in a longitudinal direction (LD) and/or a sideways direction. Conventionally LD is also the direction in which the web passes through the machine, which is known as the machine direction (denoted herein by "MD") and the sideways direction of stretch is known as the transverse direction (denoted herein by "TD") Preferred sheets are oriented in both MD and TD. Orientation of the film in either or both directions may be achieved by any suitable techniques, for example by the well known bubble and/or stenter processes.

Thus in step (c) the sheet may be stretched from an initial size to a final size in at least one direction parallel to its surface. More preferably the sheet is bi-axially oriented, most preferably in two substantially orthogonal directions such as MD and TD. Preferably step (c) is achieved using a simultaneous or sequential stenter frame or a bubble process, more preferably a bubble process.

The film thus formed comprises biaxially oriented polypropylene (also known herein as BOPP). Therefore a particularly preferred type of first polymeric material is a molecularly oriented VHCPP, especially BOPP.

Another aspect of the present invention comprises any sheet obtained and/or obtainable by a process of the present invention as described herein.

Thus improved oriented polymeric films comprising polymers of very high crystallinity (such as VHCPP of >=98% isotacity, preferably 99% isotacity) optionally in combination with other ingredients such as nucleating agents and hard resins can be obtained.

In the films, compositions and processes of the present invention, preferred aspects of the common features are given below.

Preferably the first material comprises the bulk and/or continuous phase of the sheet, composition and or layer within the sheet.

Preferably the first material comprises a very crystalline homopolymer. Most preferably the first material comprises: polyolefins [e.g. polypropylene and/or polyethylene] polyurethanes, polyvinylhalides [e.g. PVC], polyesters [e.g. polyethylene terephthalate—PET], polyamides [e.g. nylons] and/or non-hydrocarbon polymers). Advantageously the first polymeric material comprises an olefinic homopolymer, more advantageously is a very highly crystalline polypropylene (VHCPP), of isotacity >=98%, optionally >=99%, for example those available commercially from Montell under the trade names Adstif AD856 (pure VHCPP) and Adstiff AD856 (VHCPP with 0.2% of dibenzylidene sorbitol nucleating agent).

Preferably the second material is homogeneously located with the first material, more preferably dispersed (such as an emulsion) and/or dissolved (such as a solid solution) therein. Most preferably the second material comprises a polymer.

Preferably the second material is present in the core layer in an amount from about 1% to about 30%, more preferably from about 2% to about 20%, by weight of the first material in said layer.

Preferred hydrogenated hydrocarbon resins have a ring and ball softening point from about 110° C. to about 170° C., more preferably from about 140° C. to about 150° C.

Preferably the two hydrogenated hydrocarbon resins comprise at least one terpene and/or dicyclopentadiene resin (more preferably a dicyclopentadiene resin); and at least one mixed monomer resin (more preferably a resin obtained from α-methyl styrene, indene and vinyl toluene monomers). Optionally the two hydrogenated hydrocarbon resins are not both terpene resins.

Optionally the second material has a ring and ball softening point of from about 140° C. to about 150° C., conveniently about 150° C.

Preferably the second material is selected from: a dicyclopentadiene (DCPD) hydrogenated resin; a hydrogenated mixed monomer resin; an effective nucleating agent; and/or mixtures thereof.

More preferably the second material is selected from: a DCPD resin; resins obtainable from a mixture of α-methyl styrene, indene and/or vinyl toluene monomers (optionally either resin having a softening point from about 140° C. to about 150° C.); the nucleating agent(s) listed herein; and/or any mixture thereof.

Preferred DCPD resins comprise those available commercially from Hercules under the trade designation A-2468 with a softening point of 150° C. Dicyclopentadiene or DCPD denotes the monomer

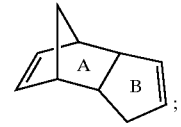

and may exist as the endo form (where the ring B is on the opposite side of ring A as the bridging methenyl group) or the exo form (where the ring B is on the same side of ring A as the bridging methenyl group).

Preferred mixed monomer resins comprise those formed from a mixture of α-methyl styrene, indene and/or vinyl toluene monomers and available commercially from Arakawa under the trade name Arkon P-150.

Preferably the weight ratio of the first to second material (if present) is respectively from about 9 to about 19.

Without wishing to be bound by any mechanism it is believed that by adding a nucleating agent to a polymer mixture the crystal particles can be made more fine and the crystallisation speed can be increased. VHCPP is a very highly isotactic polymer and it is believed that this controls the rate of crystal growth. It is also believed that the nucleating agent controls the number of crystal start points and together this results in an advantageous film. However the applicant has discovered that changing crystallisation conditions alone does not provide improved film properties, and using some VHCPP on its own, only has a limited effect. Surprisingly it has been found that the combination of certain nucleating agents with VHCPP improves the film properties by a surprising and synergistic amount.

Any suitable and effective nucleating agent may be used in the present invention such as those nucleating agents described herein and mixtures thereof, or any other nucleating agent which is found to be effective.

One preferred type of nucleating agent used in the present invention may comprise an optionally olefinic copolymer (such as a polypropylene copolymer) obtained or obtainable by polymerisation of at least one polymer precursor preferably selected from: a 3-position branched α-olefin and a vinyl cycloalkane each having at least 6 carbon atoms; more preferably selected from: 3,3-dimethylbut-1-ene, 3-methylpent-1-ene, 3-methylhexene-1,3,5,5-trimethylhex-1-ene, vinyl cyclopentane, vinyl cyclohexane and vinyl norbornane, most preferably selected from 3-methylpent-1-ene, vinyl cyclopentane and vinyl cyclohexane.

Another preferred type of nucleating agent comprise monocyclic olefin polymers such as a polymer obtained or obtainable by polymerisation of a polymer precursor (e.g. monomer) having one ring and, in the ring, one or two polymerisable double bonds. More preferred monocyclic olefin polymers comprise homopolymers of a monocyclic olefin monomer having 4–20 carbon atoms, a block or random copolymer between said monocyclic olefin monomers, or a block or random copolymer between 50 mole % or more of said monocyclic olefin monomer and 50 mole % or less of other monomer. The above monocyclic olefin monomer having 4–20 carbon atoms may be represented by the Formula A.

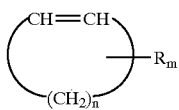

Formula A in which n is an integer of 2–3, and the hydrogen atoms may be replaced by m alkyl groups;

R each having 1–4 carbon atoms (m is an integer of 0 to (2n+2).

Most preferred monocyclic olefin monomer(s) are selected from the group consisting of: cyclobutene, cyclopentene, cyclopentadiene, 4-methylcyclopentene, 4,4-dimethylcyclopentene, cyclohexene, 4-methylcyclohexene, 4,4-dimethylcyclohexene, 1,3-dimethylcyclohexene, 1,3-cyclohexadiene, 1,4-cyclohexadiene, cycloheptene, 1,3-cycloheptadiene, 1,3,5-cycloheptatriene, cyclooctene, 1,5-cyclooctadiene and cyclododecene. Most preferred other monomer(s) are selected from the group consisting of: ethylene, propylene, but-1-ene, 3-methylbut-1-ene, 3-methylpent-1-ene and 4-methylpent-1-ene.

Yet another preferred type of nucleating agents are those represented by Formula B:

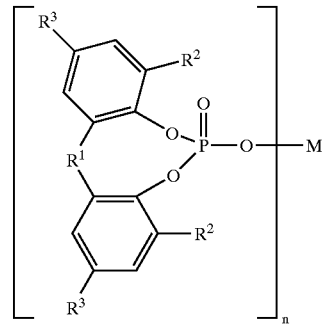

Formula B wherein $R^1$ is oxygen, sulphur or an optionally substituted divalent organo group, preferably O, S or $C_{1-10}$hydrocarbylene;

each of $R^2$ and $R^3$ are independently hydrogen or an optionally substituted organo group, preferably H or $C_{1-10}$hydrocarbyl, and optionally two of $R^2$, two of $R^3$, or $R^2$ and $R^3$ may together form a ring in whole or in part, M is a monovalent to trivalent metal atom; and n is an integer of 1 to 3.

Examples of the nucleating agents represented by Formula B comprise any of the following and any suitable mixtures of two of more of them:

sodium-2,2'-methylene-bis(4,6-di-t-butylphenyl)phosphate,
sodium-2,2'-ethylidene-bis(4,6-di-t-butylphenyl)phosphate,
lithium-2,2'-methylene-bis(4,6-di-t-butylphenyl)phosphate,
lithium-2,2'-ethylidene-bis(4,6-di-t-butylphenyl)phosphate,
sodium-2,2'-ethylidene-bis(4-i-propyl-6-t-butylphenyl) phosphate,
lithium-2,2'-methylene-bis(4-methyl-6-t-butylphenyl) phosphate,
lithium-2,2'-methylene-bis(4-ethyl-6-t-butylphenyl) phosphate,
calcium-bis[2,2'-thiobis(4-methyl-6-t-butylphenyl) phosphate],
calcium-bis[2,2'-thiobis(4-ethyl-6-t-butylphenyl) phosphate],
calcium-bis[2,2'-thiobis-(4,6-di-t-butylphenyl)phosphate],
magnesium-bis[2,2'-thiobis-(4,6-di-t-butylphenyl) phosphate],
magnesium-bis[2,2'-thiobis-(4-t-octylphenyl)phosphate],
sodium-2,2'-butylidene-bis(4,6-dimethylphenyl)phosphate,
sodium-2,2'-butylidene-bis(4,6-di-t-butylphenyl)phosphate,
sodium-2,2'-t-octylmethylene-bis(4,6-dimethylphenyl) phosphate,
sodium-2,2'-t-octylmethylene-bis(4,6-di-t-butylphenyl) phosphate,
calcium-bis[2,2'-methylene-bis(4,6-di-t-butylphenyl) phosphate],
magnesium-bis[2,2'-methylene-bis(4,6-di-t-butylphenyl) phosphate],
barium-bis[2,2'-methylene-bis(4,6-di-t-butylphenyl) phosphate],
sodium-2,2'-methylene-bis(4-methyl-6-t-butylphenyl) phosphate,
sodium-2,2'-methylene-bis(4-ethyl-6-t-butylphenyl) phosphate,
sodium(4,4'-dimethyl-5,6'-di-t-butyl-2,2'-biphenyl) phosphate,
calcium-bis[(4,4'-dimethyl-6,6'-di-t-butyl-2,2'-biphenyl) phosphate],
sodium-2,2'-ethylidene-bis(4-m-butyl-6-t-butylphenyl) phosphate, sodium-2,2'-methylene-bis(4,6-dimethylphenyl)phosphate,
sodium-2,2'-methylene-bis(4,6-diethylphenyl)phosphate,
potassium-2,2'-ethylidene-bis(4,6-di-t-butylphenyl) phosphate,
calcium-bis[2,2'-ethylidene-bis(4,6-di-t-butylphenyl) phosphate],
magnesium-bis[2,2'-ethylidene-bis(4,6-di-t-butylphenyl) phosphate],
barium-bis[2,2'-ethylidene-bis(4,6-di-t-butylphenyl) phosphate],
aluminum-tris[2,2'-methylene-bis(4,6-di-t-butylphenyl) phosphate];
aluminum-tris[2,2'-ethylidene-bis(4,6-di-t-butylphenyl) phosphate].

Sodium-2,2'-methylene-bis(4,6-di-t-butylphenyl) phosphate and mixtures comprising it are more preferred.

A still other preferred type of nucleating agents are those represented by Formula C:

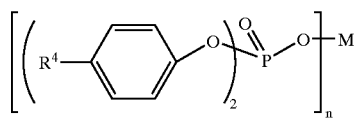

Formula C where $R^4$ is hydrogen or an optionally substituted organo group, preferably H or $C_{1-10}$hydrocarbyl;
M is a monovalent to trivalent metal atom; and
n is an integer of 1 to 3.

Examples of the nucleating agents represented by Formula C comprise any of the following and any suitable mixtures of two of more of them:
sodium-bis(4-t-butylphenyl)phosphate, sodium-bis(4-methylphenyl)phosphate,
sodium-bis(4-ethylphenyl)phosphate, sodium-bis(4-i-propylphenyl)phosphate,
sodium-bis(4-t-octylphenyl)phosphate, potassium-bis(4-t-butylphenyl)phosphate,
calcium-bis(4-t-butylphenyl)phosphate, magnesium-bis(4-t-butylphenyl)phosphate,
lithium-bis(4-t-butylphenyl)phosphate and aluminium-bis(4-t-butylphenyl)phosphate.

Sodium-bis(4-t-butylphenyl)phosphate and mixtures comprising it are more preferred.

A yet still other preferred type of nucleating agents are those represented by Formula D:

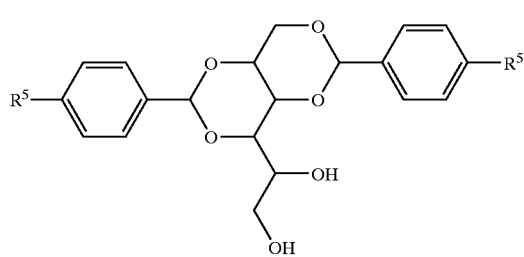

Formula D where $R^5$ is hydrogen or an optionally substituted organo group, preferably H or $C_{1-10}$hydrocarbyl.

Examples of the nucleating agents represented by Formula D comprise any of the following and any suitable mixtures of two of more of them:
1,3,2,4-dibenzylidenesorbitol, 1,3-benzylidene-2,4-p-methylbenzylidenesorbitol,
1,3-benzylidene-2,4-p-ethylbenzylidenesorbitol,
1,3-p-methylbenzylidene-2,4-benzylidenesorbitol,
1,3-p-ethylbenzylidene-2,4-benzylidenesorbitol,
1,3-p-methylbenzylidene-2,4-p-ethylbenzylidenesorbitol,
1,3-p-ethylbenzylidene-2,4-p-methylbenzylidenesorbitol,
1,3,2,4-di(p-methylbenzylidene)sorbitol,
1,3,2,4-di(p-ethylbenzylidene)sorbitol,
1,3,2,4-di(p-n-propylbenzylidene)sorbitol,
1,3,2,4-di(p-i-propylbenzylidene)sorbitol,
1,3,2,4-di(p-n-butylbenzylidene)sorbitol,
1,3,2,4-di(p-s-butylbenzylidene)sorbitol,
1,3,2,4-di(p-t-butylbenzylidene)sorbitol,
1,3,2,4-di(2',4'-dimethylbenzylidene)sorbitol,
1,3,2,4-di(p-methoxybenzylidene)sorbitol,
1,3,2,4-di(p-ethoxybenzylidene)sorbitol,
1,3-benzylidene-2,4-p-chlorobenzylidenesorbitol,
1,3-p-chlorobenzylidene-2,4-benzylidenesorbitol,
1,3-p-chlorobenzylidene-2,4-p-methylbenzylidenesorbitol,
1,3-p-chlorobenzylidene-2,4-p-ethylbenzylidenesorbitol,
1,3-p-methylbenzylidene-2,4-p-chlorobenzylidenesorbitol,
1,3-p-ethylbenzylidene-2,4-p-chlorobenzylidenesorbitol and
1,3,2,4-di(p-chlorobenzylidene)sorbitol.

1,3,2,4-Dibenzylidenesorbitol, 1,3,2,4-di(p-methylbenzylidene)sorbitol, 1,3,2,4-di(p-ethylbenzylidene) sorbitol, 1,3-p-chlorobenzylidene-2,4-p-methylbenzylidenesorbitol, 1,3,2,4-di(p-chlorobenzylidene) sorbitol and mixtures of two or more of these nucleating agents are more preferred.

Also employable are other nucleating agents such as metallic salts of aromatic carboxylic acids and metallic salts of aliphatic carboxylic acids. Examples thereof include sodium benzoate, aluminium benzoate, aluminium p-t-butylbenzoate, sodium adipate, sodium thiophenecarboxylate and sodium pyrrolecarboxylate. Inorganic compounds such as talc may be also used.

Conveniently the nucleating agent comprises: a vinyl cyclohexane/propylene copolymer (such as that available from Sumitomo under the trade name Cap-M); sodium benzoate; and/or dibenzylidene sorbitol.

The nucleating agent may be used in an amount of about 1% w/w of the total amount of first component, more preferably at a level of about 2 ppm in the final film. The nucleating agent may also be present in an amount of 0.001 to 10 parts by weight, preferably 0.01 to 5 parts by weight, more preferably 0.1 to 3 parts by weight, based on 100 parts by weight of the first polymer (e.g. VHCPP).

By the use of the nucleating agent in the above-mentioned amount, there can be obtained a propylene polymer, and film formed therefrom, which has extremely fine crystalline particles and enhanced in crystallinity without deterioration of the excellent properties inherent in the propylene polymer.

The terms 'optional substituent' and/or 'optionally substituted' as used herein (unless followed by a list of other substituents) signifies the one or more of following groups (or substitution by these groups): carboxy, sulpho, formyl, hydroxy, amino, imino, nitrilo, mercapto, cyano, nitro, methyl, methoxy and/or combinations thereof. These optional groups include all chemically possible combinations in the same moiety of a plurality (preferably two) of the aforementioned groups (e.g. amino and sulphonyl if directly attached to each other represent a sulphamoyl group). Preferred optional substituents comprise: carboxy, sulpho, hydroxy, amino, mercapto, cyano, methyl and/or methoxy.

The synonymous terms 'organic substituent' and "organic group" as used herein (also abbreviated herein to "organo") denote any univalent or multivalent moiety (optionally attached to one or more other moieties) which comprises one or more carbon atoms and optionally one or more other heteroatoms. Organic groups may comprise organoheteryl groups (also known as organoelement groups) which comprise univalent groups containing carbon, which are thus organic, but which have their free valence at an atom other than carbon (for example organothio groups). Organic groups may alternatively or additionally comprise organyl groups which comprise any organic substituent group, regardless of functional type, having one free valence at a carbon atom. Organic groups may also comprise heterocyclyl groups which comprise univalent groups formed by removing a hydrogen atom from any ring atom of a heterocyclic compound: (a cyclic compound having as ring members atoms of at least two different elements, in this case one being carbon). Preferably the non carbon atoms in an organic group may be selected from: hydrogen, halo, phosphorus, nitrogen, oxygen and/or sulphur, more preferably from hydrogen, nitrogen, oxygen and/or sulphur.

The term 'hydrocarbo group' as used herein is a sub-set of a organic group and denotes any univalent or multivalent moiety (optionally attached to one or more other moieties) which consists of one or more hydrogen atoms and one or more carbon atoms. Hydrocarbo groups may comprise one or more of the following groups. Hydrocarbyl groups comprise univalent groups formed by removing a hydrogen atom from a hydrocarbon. Hydrocarbylene groups comprise divalent groups formed by removing two hydrogen atoms from a hydrocarbon the free valencies of which are not engaged in a double bond. Hydrocarbylidene groups comprise divalent groups (represented by "$R_2C=$") formed by removing two hydrogen atoms from the same carbon atom of a hydrocarbon, the free valencies of which are engaged in a double bond; Hydrocarbylidyne groups comprise trivalent groups (represented by "$RC\equiv$"), formed by removing three hydrogen atoms from the same carbon atom of a hydrocarbon the free valencies of which are engaged in a triple bond. Hydrocarbo groups may also comprise any saturated, unsaturated double and/or triple bonds (e.g. alkenyl, and/or alkynyl respectively) and/or aromatic groups (e.g. aryl) and where indicated may be substituted with other functional groups.

Most preferably organic groups comprise one or more of the following carbon containing moieties: alkyl, alkoxy, alkanoyl, carboxy, carbonyl, formyl and/or combinations thereof; optionally in combination with one or more of the following heteroatom containing moieties: oxy, thio, sulphinyl, sulphonyl, amino, imino, nitrilo and/or combinations thereof. Organic groups include all chemically possible combinations in the same moiety of a plurality (preferably two) of the aforementioned carbon containing and/or heteroatom moieties (e.g. alkoxy and carbonyl if directly attached to each other represent an alkoxycarbonyl group):

The term 'alkyl' or its equivalent (e.g. 'alk') as used herein may be readily replaced, where appropriate and unless the context clearly indicates otherwise, by terms encompassing any other hydrocarbo group such as those described herein.

Any substituent, group or moiety mentioned herein refers to a monovalent species unless otherwise stated or the context clearly indicates otherwise (e.g. an alkylene moiety may comprise a bivalent group linked two other moieties). A group which comprises a chain of three or more atoms signifies a group in which the chain wholly or in part may be linear, branched and/or form a ring (including spiro and/or fused rings). The total number of certain atoms is specified for certain substituents for example $C_{1-m}$organo, signifies an organic group having from 1 to m carbon atoms. In any of the formulae herein if one or more ring substituents are not indicated as attached to any particular atom on the ring, the substituent may replace any hydrogen atom attached to a ring atom and may be located at any available position on the ring which is chemically suitable.

Preferably any of organic groups listed above comprise from 1 to 36 carbon atoms, more preferably from 1 to 18. It is particularly preferred that the number of carbon atoms in an organic group is from 1 to 10 inclusive.

Unless the context clearly indicates otherwise, as used herein plural forms of the terms herein are to be construed as including the singular form and vice versa.

The term 'effective' (for example with reference to the process, uses, products, materials, compounds, monomers, oligomers, polymer precursors and/or polymers of the present invention) will be understood to refer to those ingredients which if used in the correct manner provide the required properties to the material, compound, composition, monomer, oligomer, polymer precursor and/or polymer to which they are added and/or incorporated in any one or more of the uses and/or applications described herein. As used herein the term "suitable" denotes that a functional group is compatible with producing an effective product.

The substituents on the repeating unit may be selected to improve the compatibility of the materials with the polymers and/or resins in which they may be formulated and/or incorporated to form a flame retardant material. Thus, the size and length of the substituents may be selected to optimise the physical entanglement or interlocation with the resin or they may or may not comprise other reactive entities capable of chemically reacting and/or cross-linking with such other resins.

Certain moieties, species, groups, repeat units, compounds, oligomers, polymers, materials, mixtures, compositions and/or formulations which comprise some or all of the invention as described herein may exist as one or more stereoisomers (such as enantiomers, diastereoisomers, geometric isomers, tautomers and/or conformers), salts, zwitterions, complexes (such as chelates, clathrates, crown compounds, cyptands/cryptades, inclusion compounds, intercalation compounds, interstitial compounds, ligand complexes, non-stoichiometric complexes, organometallic complexes, π-adducts, solvates and/or hydrates); isotopically substituted forms, polymeric configurations [such as homo or copolymers, random, graft or block polymers, linear or branched polymers (e.g. star and/or side branched polymers), hyperbranched polymers and/or dendritic macromolecules (such as those of the type described in WO 93/17060), cross-linked and/or networked polymers, polymers obtainable from di and/or tri-valent repeat units, dendrimers, polymers of different tacticity (e.g. isotactic, syndiotactic or atactic polymers)]; polymorphs [such as interstitial forms, crystalline forms, amorphous forms, phases and/or solid solutions] combinations thereof where possible and/or mixtures thereof. The present invention comprises all such forms which are effective.

It is appreciated that certain features of the invention, which are for clarity described in the context of separate embodiments may also be provided in combination in a single embodiment. Conversely various features of the invention, which are for brevity, described in the context of a single embodiment, may also be provided separately or in any suitable sub-combination.

The term "comprising" as used herein will be understood to mean that the list following is non-exhaustive and may or may not include any other additional suitable items, for example one or more further feature(s), component(s), ingredient(s) and/or substituent(s) as appropriate.

Other aspects of sheets and/or films are the present invention are now described.

Sheets of the present invention may comprise any suitable, well known sheeting materials (optionally as the first material) if they are capable of being oriented and/or may use such sheeting materials as supporting substrates (for example if a sheet of the present invention is not self supporting) and/or other layer(s) if the sheet of the present invention comprises one layer in a multi-layer and/or laminate film. Suitable sheeting materials comprise any of the following: polymer film (especially polyolefinic film), paper, synthetic paper, woven fabric, non-woven fabric, ceramic sheet, metallic fibre sheet, metallised sheet or film, metallic foil, metallic plate and/or multilayer composite sheet formed by any suitable combinations and/or mixtures of said materials. For sheets intended for use as labels, polyolefin films are preferred, especially oriented polypropylene film.

The film may comprise a major proportion of polypropylene such as VHCPP, but also may comprise coextruded multilayer films where the polymer of at least one layer comprises VHCPP, and the polymer of one or both outer layers is a polymer having different properties. Such surface layer polymer(s) may be, for example, a copolymer of propylene with a minor amount of one or more other 1-olefins, such as ethylene and/or butylene.

The sheet of the present invention may consist of only one layer, i.e. the layer described herein, however it is preferred that the sheet is multi-layered i.e. comprises a plurality of layers. The layers can be combined by lamination or co-extrusion. More preferably the sheet comprises at least three layers where each layer(s) are sandwiched between other layers such that none of each layer(s) form either surface of the sheet.

Thus for example a film of the invention may comprise a three layer film where the polymer of a central or core layer comprises the second polymeric material. The core layer may have a thickness of about 90 to about 98% of the total thickness of the film. The remainder of such a three layer film may comprise two outer layers of the first polymeric material, with each outer layer having substantially identical thickness.

Another film of the present invention may comprise a coextruded five layer film comprising a central core layer, two layers contiguous to the central core layer and two outermost layers, where the central core layer and such contiguous layers comprise the second polymeric material and the two outer layers comprise the first polymeric material. Preferably the central core layer has a thickness from about 70% to about 96%, more preferably from about 76% to about 90%, of the total thickness of the film. Preferably each of such contiguous layers has substantially the same thickness, which is more preferably from about 1% to about 6%, most preferably from about 1% to about 2%, of the total thickness of the film. Preferably each outer layer has substantially the same thickness, which is more preferably from about 1% to about 6%, most preferably from about 1% to about 2%, of the total thickness of the film.

One or more layers of the films of the present invention may be opaque or transparent depending on the end use of the film. Such layers may also comprise voids introduced by stretch orienting such a layer containing spherical particles of a material higher melting than and/or immiscible with the layer material (e.g. calcium carbonate and/or polybutylene terephthalate). If the layer comprises isotactic polypropylene homopolymer, then such particles maybe, polybutylene terephthalate, as shown, for example, in U.S. Pat. No. 4,632,869 and U.S. Pat. No. 4,720,716.

In an optional embodiment of the present invention the sheet has a mean thickness above about 20 microns, more preferably from about 15 microns to about 150 microns.

Sheets of the present invention may further comprise one or more of the following ingredients, mixtures and/or combinations thereof optionally located in any suitable layer; and it will be appreciated that any of the ingredients herein may exhibit more than one property or be added for more than one purpose:

oxidising agents such as those of the type commercially available from Ciba and/or Great Lakes under the trade names of Irganox 1010 and Irgafos 168;

anti-static agents preferably of the glycerol mono-stearate type such as those commercially available from ICI surfactants under the trade name Atmer 129 and/or ethoxylated amines such as those commercially available from Akzo Nobel under the trade name Armostat 300;

free radical scavenger(s);

and/or UV attenuating material(s).

More preferred sheets comprise the UV attenuating material(s) in an amount such that the sheet retains at least 50% of its mechanical properties after exposure to artificial weathering (Dry Cycle 0.35W\m$^2$ C340 nm BST 63°) for about 2500 hours (which equates to an outdoor lifetime of about 2 years). Most preferably the sheet comprises the UV attenuating material(s) in an amount from about 0.1% to about 0.5% by weight of the first material.

UV attenuating material will be understood to be any material which acts to reduce the effect of incident UV radiation on the film by any suitable chemical and/or physical effects, such as by reflection, absorption, refraction, scattering and/or otherwise. Examples of suitable UV attenuating materials include: benzophenone and/or bentriazole.

It will be well understood by those skilled in the art that a sheet of the present invention may additional comprise further additives and/or may be coated by any suitable means to provide additional desired end properties to the sheet.

If desired, before coating a sheet of the present invention may be subjected to a chemical or physical surface-modifying treatment to insure that the coating will better adhere to the sheet thereby reducing the possibility of the coating peeling or being stripped from the sheet. Known prior art techniques for surface pre-treatment prior to coating comprise, for example: film chlorination, i.e., exposure of the film to gaseous chlorine; treatment with oxidising agents such as chromic acid, hot air or steam treatment; flame treatment and the like. A preferred treatment, because of its simplicity and effectiveness, is the so-called electronic treatment in which the sheet is passed between a pair of spaced electrodes to expose the sheet surface to a high voltage electrical stress accompanied by corona discharge. Optionally if even adhesion of the coating is desired an intermediate continuous coating of primer material can applied to a sheet surface treated by any of the methods described herein. Primer materials may comprise titanates and poly(ethylene imine) and may be applied as conventional solution coatings [such as poly(ethylene imine) applied as either an aqueous or organic solvent solution, e.g. in ethanol comprising about 0.5 wt. % of the imine].

One or more of the layers of the sheet of the invention (such as films) may conveniently contain any of the additives and/or coatings conventionally employed in the manufacture of sheets and such additives and/or coatings may be added for more than one effect. Such additives and/or coatings may be selected from one or more of the following, mixtures thereof and/or combinations thereof: dyes; pigments, colorants; metallised and/or pseudo-metallised coatings; lubricants, anti-static agents [cationic, anionic and/or non-ionic, e.g. poly(oxyethylene) sorbitan monooleate], anti-oxidants, surface-active agents, stiffening aids, slip aids (such as hot slips aids or cold slip aids which improve the ability of a film to satisfactorily slide across surfaces at about room temperature, e.g. micro-crystalline wax); gloss-improvers, prodegradants, barrier coatings to alter the gas and/or moisture permeability properties of the film (such as polyvinylidene halides, e.g. PVdC); anti-blocking aids (such as microcrystalline wax, e.g. with an average particle size from about 0.1 to about 0.6 microns); tack reducing additives (such as fumed silica); particulate materials (such as talc); additives to reduce coefficient of friction (COF) (such as a terpolymer of about 2 to 15 wt. % of acrylic or methacrylic acid, 10 to 80 wt. % of methyl or ethyl acrylate, and 10 to 80 wt. % of methyl methacrylate, together with colloidal silica and carnauba wax, as described in U.S. Pat. No. 3,753,769); sealability additives; additives to improve ink adhesion and/or printability, cross-linking agents (such as melamine formaldehyde resin); adhesive layer (e.g. a pressure sensitive adhesive); and/or an adhesive release layer (e.g. for use as a liner in peel plate label applications).

Some or all of the desired additives listed above may be added together as a composition to coat the sheet of the present invention and/or form a new layer which may itself be coated (i.e. form the central core layer of a final sheet) and/or may form the outer or surface layer of the sheet. Alternatively some or all of the preceding additives may be added separately and/or incorporated directly into the bulk of the sheet optionally during and/or prior to the sheet formation (e.g. as part of the original polymer composition) and thus may or may not form layers or coatings as such.

A coating composition may be applied to the treated surface of sheet (such as the polymer film) in any suitable manner such as by gravure coating, roll coating, dipping, spraying, etc. The excess liquid (e.g. aqueous solution) can be removed by squeeze rolls, doctor knives, etc. The coating composition will ordinarily be applied in such an amount that there will be deposited following drying, a smooth, evenly distributed layer of from about 0.1 to about 15 micron thickness. In general, the thickness of the applied coating is such that it is sufficient to impart the desired characteristics to the substrate sheet. Once applied to the sheet a coating may be subsequently dried by hot air, radiant heat or by any other suitable means to provide a sheet of the present invention with the other desired properties (such as a non-water soluble, optionally clear, adherent, glossy coated film useful, for example, in labelling and/or graphic arts applications).

Further aspects of the present invention are given below:

Use of a polymeric composition of the present invention (and/or the first and/or second polymeric materials as described herein) to make oriented sheets of the present invention.

An article wrapped (preferably shrink wrapped) with a sheet of the present invention.

A method of packaging an article comprising the step(s) of wrapping the article with a sheet of the present invention and optionally shrinking the film to more tightly fit the article for example to better exclude water and/or air.

The article may be any suitable article which may benefit from being packaged in the improved films of the present invention. Such articles include but are not limited to products which may be humidity and/or air sensitive such as tobacco products e.g. cigarette packs.

Use of a sheet of the present invention to protect an article from oxygen and/or water.

In a further aspect of the present invention there is provided a label, security, marking and/or display device comprising a sheet of the present invention.

Another aspect of the present invention provides for use of a sheet of the present invention in a method of manufacture of a label, tag or other display device, preferably suitable for use in the field(s) of labelling, graphic arts, security and/or displays.

A still further aspect of the present invention provides for use a sheet of the present invention in a method labelling, graphic arts, security and/or displays.

Figure 2:
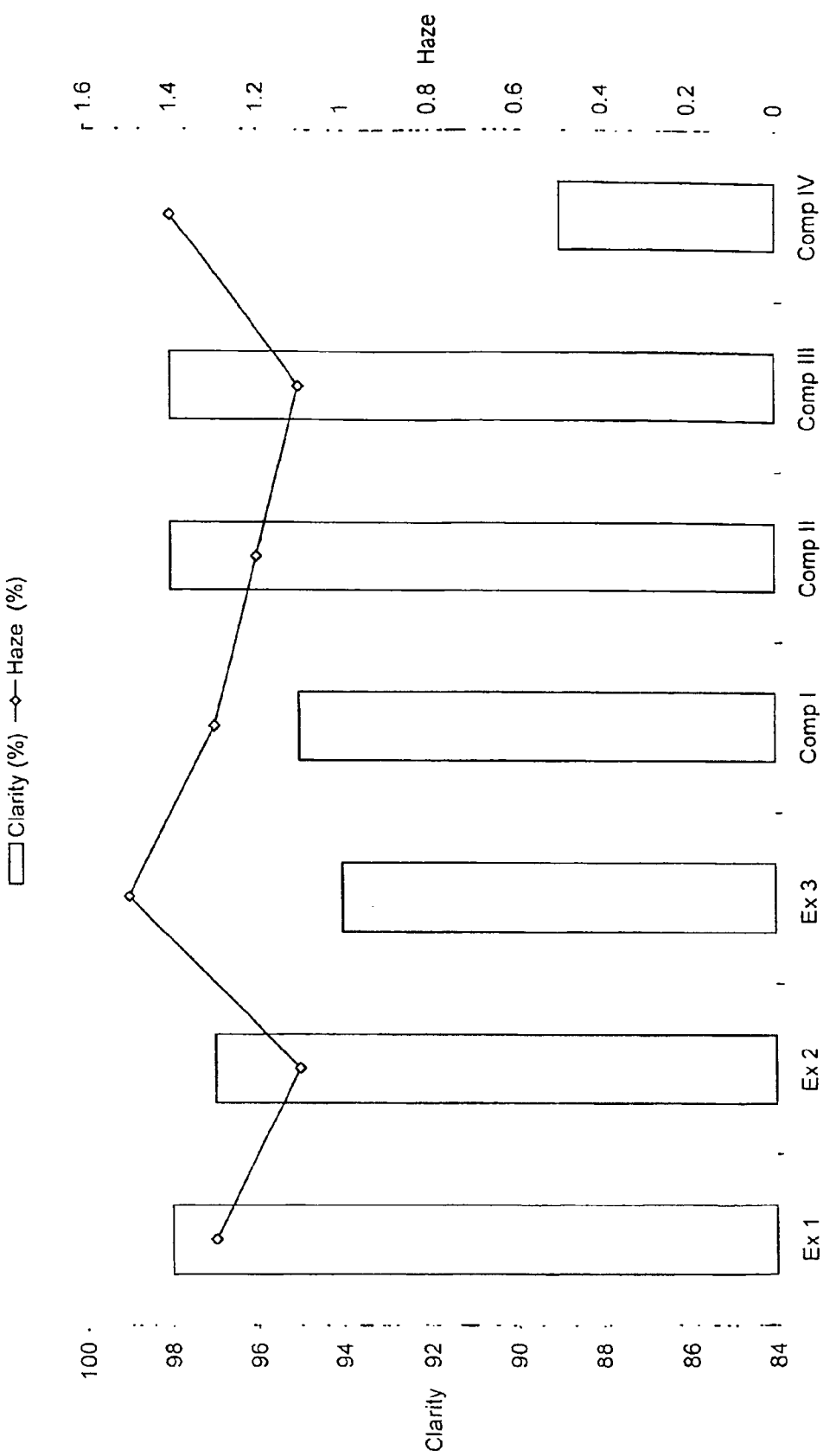
Figure 3:
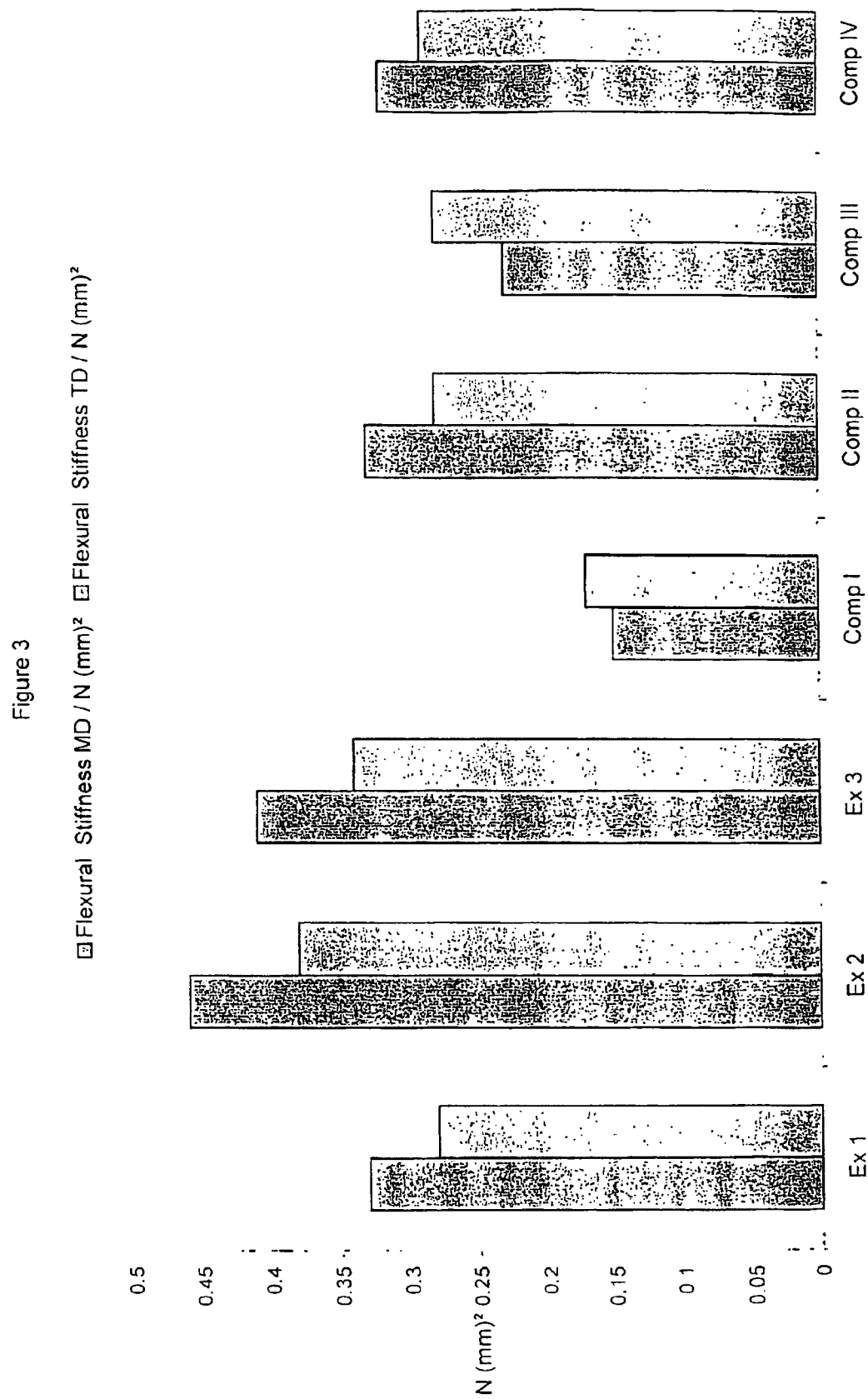

The present invention is illustrated by the FIGS. 1 to 4 herein which are plots comparing various properties of certain prior art films (Comp I to IV—see below) with films of the present invention (Examples 1 to 3—see below) in which:

FIG. 1 gives comparative water vapour transmission rate (WVTR) results in g/24 hours/m$^2$ and oxygen transmission rate (OTR) results in cm$^3$/24 hours/m$^2$ both normalised for a film of 20 micron thickness;

FIG. 2 gives comparative optical properties as measured by haze (%) and clarity (%);

FIG. 3 gives comparative flexural stiffness results in Nm$^2$; and

Figure 4:
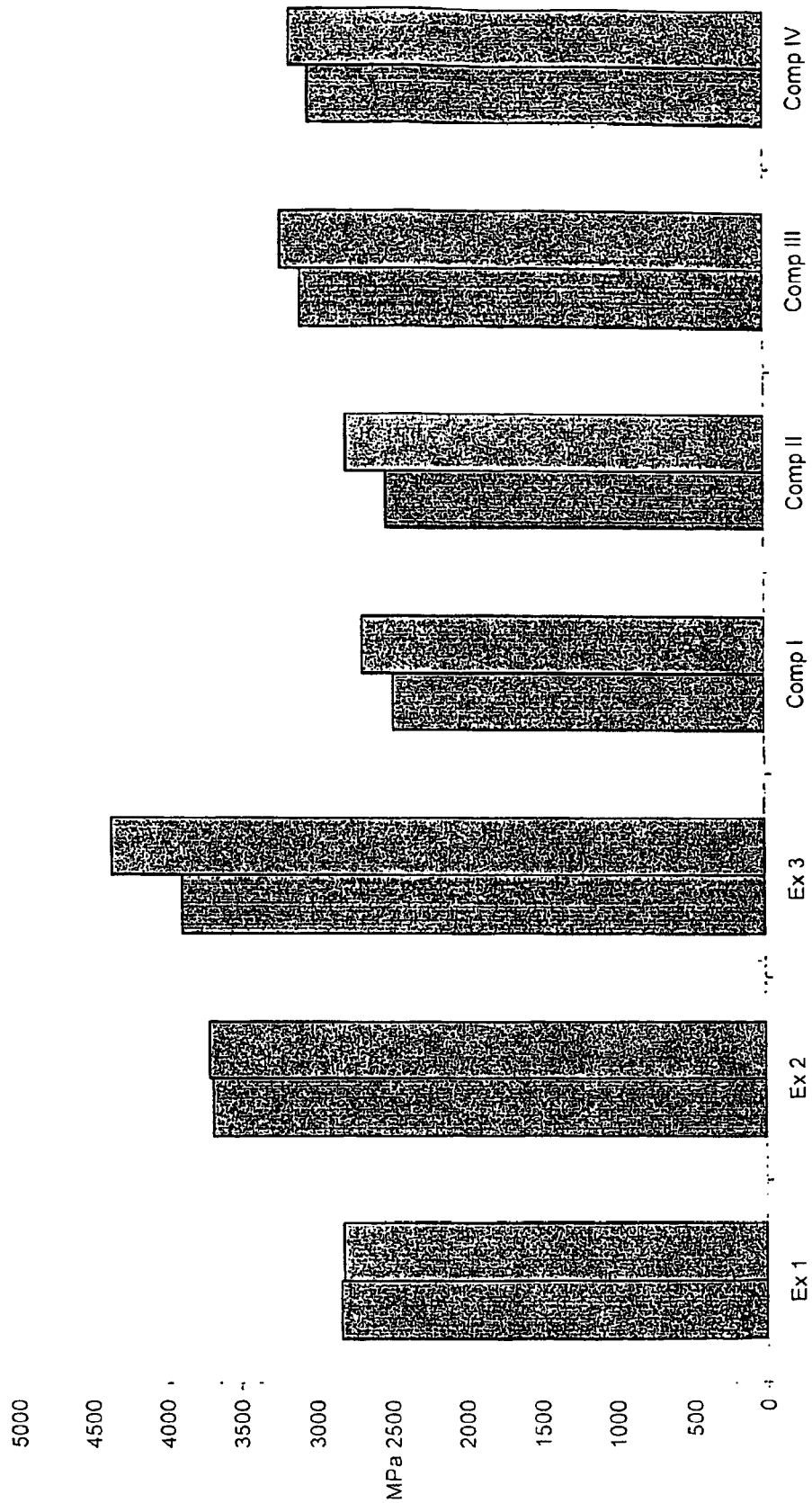

FIG. 4 gives comparative Young's modulus results in MPa.

BUBBLE PROCESS

Films of the invention may comprise five layered laminated BOPP films prepared by a bubble process as follows. The film is formed by (co)extrusion of three compositions through a triple channel annular die. A composition of polypropylene from the middle channel of the die forms the bubble wall (denoted herein by composition A); the composition in outermost channel of the die will coat the bubble's exterior surface (denoted herein by composition B), and the composition from the inner channel will coat the bubble's interior surface (denoted herein by composition C). As the three compositions are coextruded, air is blown through the die to form a tubular bubble which is coated on both its exterior and interior sides. As it is extruded from the die the coated polypropylene tubular co-extrudate is cooled by passage over a mandrel within the tube, and externally quenched by passage through a water bath surrounding the mandrel. The tube is then heated to stretching temperature, expanded by internal gas pressure (to form the bubble), and withdrawn from the expansion zone at a rate greater than that at which it was fed thereto, so that the bubble is stretched to between seven and eight times its original dimensions in both the direction of extrusion (MD) and in a direction transverse thereto (TD). The stretched tubular film is then collapsed and split. The film may optionally be heat-set at a chosen temperature (for example any temperature between 60° C. to 140° C.) on a matt-surfaced roller heat-setter (e.g. of the kind described in GB-A-1124886).

Optionally the resultant film may comprise two identical coated sides of the bubble walls laminated together to form a five layered film comprising a single inner layer (composition C), surrounded by two identical two film layers (composition A); and two identical outer coats which form both the film surfaces (composition B). Thus a film formed by this method has a B/A/C/A/B layered structure, although alternatively the resultant film can be characterised as a six layer film since the inner layer "C" is formed by laminating two layers together.

Preferred BOPP films of the invention can be prepared by the bubble process as described above, where:

Composition A may be any stabilised homopolymer polypropylene suitable for film production for example those having a MFI (Melt Flow Index measured at 230° C./2.16 kg) of about 6.5 to about 9.0; and Compositions B and C may be melt coat polymers selected from any combination of ethylene-propylene random copolymers, propylene-butylene random copolymers, linear low density polyethylene and/or propylene-butylene-ethylene random terpolymers. The melt coats may also comprise synthetic silica (as an anti-block agent) and silicone gum (as a slip additive).

It will be appreciated that other films (not necessarily those tested herein) could be formed by replacing any of these compositions A to C specified above by other suitable compositions. For example: Composition A may comprise a mixture of a polymer of polypropylene containing a small concentration (from about 0.5% to about 1.0% w/w) of polyethylene; and/or Composition B may comprise a propylene (92% w/w)/polyethylene (4% w/w)/polybutylene (4% w/w) terpolymer. The Examples herein illustrate the present invention by showing films comprising improved inner compositions (Composition A), and where for ease of comparison the films comprise the same, equivalent, or no outer compositions (Compositions B and C).

The invention is further illustrated by reference to the following non-limiting Examples

COMPARATIVE EXAMPLES

Comparative Examples I to IV herein were prepared by the bubble process described above in which the inner film layer (Composition A) comprises those compositions described below. The results of various tests are given in FIGS. 1 to 4.

Comp I

In this comparative example, a film was prepared as described above in which composition A consisted of the conventional, 95%–96% isotactic, HCPP homopolymer available commercially from Targor under the trade name N1102M.

Comp II

In this comparative example, a film was prepared as described above in which composition A consisted of a mixture of a conventional nucleated 95%–96% isotactic, HCPP homopolymer and 0.04% of a sodium benzoate nucleating agent. Such a mixture is available commercially from Targor under the trade name NQ10045.

Comp III

In this comparative example, a film was prepared as described above in which composition A consisted of a mixture of the conventional 95–96% isotactic HCPP homopolymer available commercially from Targor under the trade name N1102M; and 10% by weight of the hydrogenated mixed monomer resin of softening point 125° C., available commercially from Arakawa under the trade name Arkon P-125.

Comp IV

In this comparative example, a film was prepared as described above in which Composition A consisted of the substantially pure 98% to 99% isotactic VHCPP homopolymer available commercially from Montell under the trade name Adstif AD856.

EXAMPLES

Example 1

Using Pure VHCPP [=Adstif AD856] Plus Separate Nucleating Agent

In Example 1, a film of the present invention was prepared by the bubble process described above, in which Composition A consisted of a mixture of the substantially pure 98% to 99% isotactic VHCPP homopolymer available commercially from Montell under the trade name Adstif AD856 and 0.2% by weight of the vinyl cyclohexane/propylene copolymer nucleating agent available from Sumitomo under the trade name Cap-M.

Examples 2 to 5

Using Pre-nucleated Mixture of VHCPP+ Nucleating Agent [=Adstif AD855]

PP Resin Compositions

Various polypropylene (PP) resin compositions were prepared as follows. The resin composition comprised either: (i) the dicyclopentadiene (DCPD) resin (softening point 150° C.) available from Hercules under the trade designation A-2468; or (ii) the hydrogenated mixed monomer resin (softening point 150° C.) available from Arakawa under the trade name Arkon P-150. Components (i) or (ii) were melt blended with a VHCPP/0.2% of a β-sorbitol nucleating agent nucleating agent mixture available from Montel under the trade name Adstif AD855. The components were combined in a variety of weight ratios as given below to give PP resin compositions which were used to prepare a film as described below in Examples 2 to 5.

Test Films

Various test films were made from various PP resin compositions (as described in Examples 2 to 5 below) prepared as described above. The PP resin compositions were melt blended in to polymer granules using a twin screw extruder under high shear conditions. The granules were then pressed in to plaques and quenched at a temperature of 20° C. using mains water. The plaques of PP/resin were then drawn in a conventional manner at 155° C. on a TM long stretcher to form samples of biaxially oriented polypropylene (BOPP) film. The films obtained exhibit desirable and/or synergistic properties, especially where the films are formed from compositions in which the respective weight ratio of resin to PP is from about 5:95 to about 10:90.

Example 2

The film was prepared as described above from a composition of 10% DCPD resin with 90% Adstif AD855.

Example 3

The film was prepared as described above from a composition of 5% DCPD resin with 95% Adstif AD855.

Example 4

The film was prepared as described above from a composition of 10% Arkon P-150 with 90% Adstif AD855.

Example 5

The film was prepared as described above from a composition of 5% Arkon P-150 with 95% Adstif AD855.

Films in which each of the compositions of Examples 2 to 5 comprise the inner layer (Composition A) of a film made by the bubble process described above have also been prepared.

Advantages of the films of the invention include some or all of the following: synergistic performance for the same amount of resin incorporated in to film; improved flexural stiffness, gloss, clarity, haze, shrinkage properties, tensile strength and elongation at break film properties; and/or improved performance on existing tobacco overwrap film grades with only a small cost increment;

Some of the films prepared herein were tested and the results are given in the table below (some of these results are plotted in FIGS. 1 to 4 herein). The results illustrate some of the advantages of films of the present invention.

Directional film properties were measured in the direction (TD or MD) as indicated in the table, using the methods as described or indicated herein.

Table 2 shows DSC measurements taken for various films, where "ΔH" denotes the transition energy of the film in $Jg^{-1}$ which is a measure of the amount of crystallinity in the film. For each example given transition energy was measured using the standard method at three stages, after an initial heating of the film, after cooling the film and then after reheating the film at the temperatures given in the table.

TABLE 1

| Property | Ex 1 | Ex 2 | Ex 3 | Comp I | Comp II | Comp III | Comp IV |
|---|---|---|---|---|---|---|---|
| Flexural Stiffness MD/ $N(mm)^2$ | 0.33 | 0.46 | 0.41 | 0.15 | 0.33 | 0.23 | 0.32 |
| Flexural Stiffness TD/ $N(mm)^2$ | 0.28 | 0.38 | 0.34 | 0.17 | 0.28 | 0.28 | 0.29 |
| WVTR g $m^{-2}$/24 hr | 6.0 | 4.1 | 4.9 | 8.0 | 7.7 | 6.0 | 6.3 |
| OTR $cm^3$ $m^{-2}$/24 hr | 1848 | 1194 | 1338 | 2081 | 1726 | 1638 | 1813 |
| Haze/% | 1.3 | 1.1 | 1.5 | 1.3 | 1.2 | 1.1 | 1.4 |
| Clarity/% | 98 | 97 | 94 | 95 | 98 | 98 | 89 |
| Young's modulus MD/ MPa | 2835 | 3683 | 3884 | 2474 | 2515 | 3083 | 3029 |
| Young's modulus TD/ MPa | 2817 | 3702 | 4359 | 2673 | 2777 | 3206 | 3153 |
| Tensile Strength MD/MPa | 205 | 206 | 200 | 194 | 213 | 166 | 210 |
| Tensile Strength TD/MPa | 238 | 243 | 221 | 189 | 221 | 208 | 242 |
| EAB MD/% | 93.1 | 103.5 | 93.4 | 100.6 | 92.6 | 88.5 | 98.9 |
| EAB TD/% | 91.5 | 86.1 | 76.0 | 68.9 | 68.3 | 83.6 | 83.2 |

TABLE 2

(Characterisation using DSC analysis)

| Property | Ex 1 | Ex 2 | Comp I | Comp III | Comp IV |
|---|---|---|---|---|---|
| Heat Temp/° C. | 168.7 | 163.7 | 166.0 | 160.0- | 167.3 |
| Heat ΔH/$Jg^{-1}$ | 117.8 | 108.4 | 104.4 | 86.9 | 116.8 |
| Cool Temp/° C. | 124.3 | 115.0 | 107.7 | 109.3 | 112.3 |
| Cool ΔH/$Jg^{-1}$ | −104.2 | −92.8 | −96.8 | −79.6 | −99.5 |
| Reheat Temp/° C. | 165.3 | 161.3 | 163.0 | 159.3 | 162.7 |
| Reheat ΔH/$Jg^{-1}$ | 106.7 | 107.4 | 107.2 | 96.7 | 108.8 |

Films formed from compositions comprising two or more resins with VHCPP would be even more preferred.

It will be apparent to those skilled in the art that the specific embodiments discussed above can be successfully repeated with ingredients equivalent to those generically or specifically set forth above and under variable process conditions. From the foregoing specification, one skilled in the art can readily ascertain the essential features of this invention and without departing from the spirit and scope thereof can adapt it to various diverse applications.

What is claimed is:

1. An oriented polymeric film comprising at least one (a) layer comprising
    (a) a first material which is very highly crystalline polypropylene homopolymer (VHCPP) having a very high intermolecular stereoregularity consisting of at least about 98% of isotactic polymer the remainder of the material (if any) being atactic polymer; together with
    (b) a second material comprising
        i) at least one polymer having a ring and ball softening point from 110° C. to 170° C. and/or a nucleating agent; and/or
        ii) at least two second materials comprising hydrogenated hydrocarbon resin(s) of different types and/or nucleating agent(s),
    where the second material is added in an amount sufficient for the film to exhibit two or more of the following properties measured in any direction parallel to the film surface and where necessary normalized for a 20 micron thick film:
    WVTR less than about 6 g/24 hours/$m^2$;
    OTR less than about 1,500 $cm^3$/24 hours/$m^2$;
    Young's modulus from 4000 MPa to 5000 MPa,
    Flexural modulus from 0.4 $N(mm)^2$ to 0.7 N $(mm)^2$;
    haze less than about 1.1%; and/or
    a clarity greater than 97%.

2. A multilayer film comprising a polymeric film according to claim 1 and one or more outer layers of different polymeric composition.

3. The film according to claim 1 which is oriented in one or two directions.

4. The film according to claim 3 in which the VHCPP has an isotacity of at least 99%.

5. The film according to claim 1 in which the second polymeric material comprises a hydrogenated resin which is a dicyclopentadiene hydrogenated resin, a hydrogenated mixed monomer resin or a resin obtainable from a mixture of α-methyl styrene, indene and/or vinyl toluene monomers.

6. The film according to claim 1, in which the second polymeric material comprises a nucleating agent which is:
    (a) optionally olefinic copolymer(s) obtainable by polymerization of at least one polymer precursor;
    (b) monocyclic olefin polymer(s) obtainable by polymerization of a polymer precursor having one ring, and in the ring, one or two polymerizable double bonds;

(c) monocyclic olefin polymer(s) comprising homopolymers of a monocyclic olefin monomer having 4–20 carbon atoms and represented by Formula A:

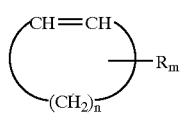

in which n is an integer of 2–3, and the hydrogen atoms may be replaced by m alkyl groups;

R each having 1–4 carbon atoms (m is an integer of 0 to (2n+2); block or random copolymer(s) between said monocyclic olefin monomers; or block or random copolymer(s) between 50 mole % or more of said monocyclic olefin monomers and 50 mole % or less of other monomers;

(d) compounds represented by Formula B:

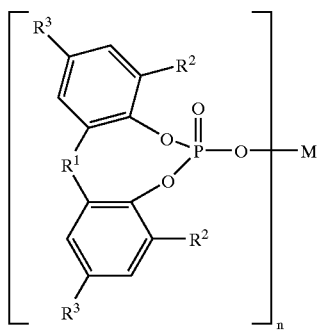

wherein $R^1$ is oxygen, sulphur or an optionally substituted divalent organo group;

each of $R^2$ and $R^3$ are independently hydrogen or an optionally substituted organo group, and optionally two of $R^2$, two of $R^3$ or $R^2$ and $R^3$ may together form a ring in whole or in part;

M is a monovalent to trivalent metal atom; and n is an integer of 1 to 3;

(e) compounds represented by Formula C:

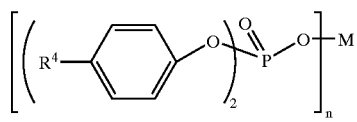

where $R^4$ is hydrogen or an optionally substituted organo group;

M is a monovalent to trivalent metal atom; and n is an integer of 1 to 3, (f) compounds represented by Formula D:

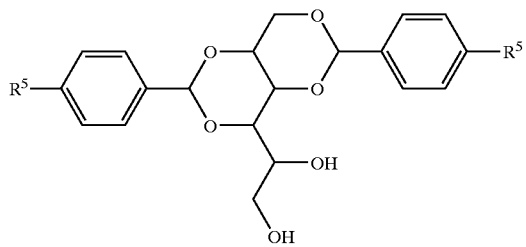

where $R^5$ is hydrogen or an optionally substituted organo group;

(g) metallic salts of aromatic carboxylic acids and metallic salts of aliphatic carboxylic acids;

(h) inorganic compounds or (i) mixtures and/or combinations of (a)–(h).

7. The film according to claim 6, in which the nucleating agent is a monocyclic olefin polymer(s) comprising homopolymers of a monocyclic olefin monomer(s) selected from the group consisting of: cyclobutene, cyclopentene, cyclopentadiene, 4-methylcyclopentene, 4,4-dimethylcyclopentene, cyclohexene, 4-methylcyclohexene, 4,4-dimethylcyclohexene, 1,3-dimethylcyclohexene, 1,3-cyclohexadiene, 1,4-cyclohexadiene, cycloheptene, 1,3-cycloheptadiene, 1,3,5-cycloheptatriene, cyclooctene, 1,5-cyclooctadiene and cyclododecene; block or random copolymer(s) between said monocyclic olefin monomers; or block or random copolymer(s) between 50 mole % or more of said monocyclic olefin monomers and 50 mole % or less of other monomers.

8. The film according to claim 6 in which the other monomer(s) are selected from the group consisting of: ethylene, propylene, but-1-ene, 3-methylbut-1-ene, 3-methylpent-1-ene and 4-methylpent-1-ene.

9. A film according to claim 6 in which the nucleating agent is represented by Formula B and comprise any of the following or mixtures of two or more of them:

sodium-2,2'-methylene-bis(4,6-di-t-butylphenyl) phosphate,
sodium-2,2'-ethylidene-bis(4,6-di-t-butylphenyl) phosphate,
lithium-2,2'-methylene-bis(4,6-di-t-butylphenyl) phosphate,
lithium-2,2'-ethylidene-bis(4,6-di-t-butylphenyl) phosphate,
sodium-2,2'-ethylidene-bis(4-i-propyl-6-t-butylphenyl) phosphate,
lithium-2,2'-methylene-bis(4-methyl-6-t-butylphenyl) phosphate,
lithium-2,2'-methylene-bis(4-ethyl-6-t-butylphenyl) phosphate,
calcium-bis[2,2'-thiobis(4-methyl-6-t-butylphenyl) phosphate],
calcium-bis[2,2'-thiobis(4-ethyl-6-t-butylphenyl) phosphate],
calcium-bis[2,2'-thiobis-(4,6-di-t-butylphenyl) phosphate],
magnesium-bis[2,2'-thiobis-(4,6-di-t-butylphenyl) phosphate],
magnesium-bis[2,2'-thiobis-(4-t-octylphenyl)phosphate],
sodium-2,2'-butylidene-bis(4,6-dimethylphenyl) phosphate, sodium-2,2'-butylidene-bis(4,6-di-t-butylphenyl) phosphate, sodium-2,2'-t-octylmethylene-bis(4,6-dimethylphenyl) phosphate, sodium-2,2'-t-octylmethylene-bis(4,6-di-t-butylphenyl) phosphate, calcium-bis[2,2'-methylene-bis(4,6-di-t-butylphenyl) phosphate], magnesium-bis(2,2'-methylene-bis(4,6-di-t-butylphenyl) phosphate], barium-bis[2,2'-methylene-bis(4,6-di-t-butylphenyl) phosphate], sodium-2,2'-methylene-bis(4-methyl-6-t-butylphenyl) phosphate, sodium-2,2'-methylene-bis(4-ethyl-6-t-butylphenyl) phosphate, sodium(4,4'-dimethyl-5,6'-di-t-butyl-2,2'-biphenyl) phosphate, calcium-bis[(4,4'-dimethyl-6,6'-di-t-butyl-2,2'-biphenyl) phosphate, sodium-2,2'-ethylidene-bis(4-m-butyl-6-t-butylphenyl) phosphate, sodium-2,2'-methylene-bis(4,6-dimethylphenyl) phosphate, sodium-2,2'-methylene-bis(4,6-diethyphenyl)phosphate, potassium-2,2'-ethylidene-bis(4,6-di-t-butylphenyl) phosphate, calcium-bis[2,2'-ethylidene-bis(4,6-di-t-butylphenyl) phosphate], magnesium-bis[2,2'-ethylidene-bis(4,6-di-t-butylphenyl) phosphate], barium-bis[2,2'-ethylidene-bis(4,6-di-t-butylphenyl) phosphate], aluminum-tris[2,2'-methylene-bis(4,6-di-t-butylphenyl) phosphate];

aluminum-tris[2,2'-ethylidene-bis(4,6-di-t-butylphenyl) phosphate].

10. The film according to claim 9 in which the nucleating agent is sodium-2,2'-methylenebis(4,6-di-t-butylphenyl) phosphate and/or mixtures comprising it.

11. The film according to claim 6 in which the nucleating agent is represented by Formula C and comprises and of the following or mixtures of two of more of them:

sodium-bis(4-t-butylphenyl)phosphate, sodium-bis(4-methylphenyl)phosphate, sodium-bis(4-ethylphenyl) phosphate, sodium-bis(4-i-propylphenyl)phosphate, sodium-bis(4-t-octylphenyl)phosphate, potassium-bis(4-t-butylphenyl)phosphate, calcium-bis(4-t-butylphenyl)phosphate, magnesium-bis(4-t-butylphenyl)phosphate, lithium-bis(4-t-butylphenyl) phosphate and aluminum-bis(4-t-butylphenyl) phosphate.

12. The film according to claim 11 in which the nucleating agent is sodium-bis(4-t-butylphenyl)phosphate and/or mixtures comprising it.

13. The film according to claim 6 in which the nucleating agent is represented by Formula D and comprises any of the following or mixtures of two or more of them:

1,3,2,4-dibenzylidenesorbitol, 1,3-benzylidene-2,4-p-methylbenzylidenesorbitol, 1,3-benzylidene-2,4-p-ethylbenzylidenesorbitol, 1,3-p-methylbenzylidene-2,4-benzylidenesorbitol, 1,3-p-ethylbenzylidene-2,4-benzylidenesorbitol, 1,3-p-methylbenzylidene-2,4-p-ethylbenzylidenesorbitol, 1,3-p-ethylbenzylidene-2,4-p-methylbenzylidenesorbitol, 1,3,2,4-di(p-methylbenzylidene)sorbitol, 1,3,2,4-di(p-ethylbenzylidene)sorbitol, 1,3,2,4-di(p-n-propylbenzylidene)sorbitol, 1,3,2,4-di(p-i-propylbenzylidene)sorbitol, 1,3,2,4-di(p-n-butylbenzylidene)sorbitol, 1,3,2,4-di(p-s-butylbenzylidene)sorbitol, 1,3,2,4-di(p-t-butylbenzylidene)sorbitol, 1,3,2,4-di(2',4'-dimethylbenzylidene)sorbitol, 1,3,2,4-di(p-methoxybenzylidene)sorbitol, 1,3,2,4-di(p-ethoxybenzylidene)sorbitol, 1,3-benzylidene-2,4-p-chlorobenzylidenesorbitol, 1,3-p-chlorobenzylidene-2,4-benzylidenesorbitol, 1,3-p-chlorobenzylidene-2,4-p-methylbenzylidenesorbitol 1,3-p-chlorobenzylidene-2,4-p-ethylbenzylidenesorbitol, 1,3-p-methylbenzylidene-2,4-p-chlorobenzylidenesorbitol, 1,3-p-ethylbenzylidene-2,4-p-chlorobenzylidenesorbitol and 1,3,2,4-di(p-chlorobenzylidene)sorbitol.

14. The film according to claim 13 in which the nucleating agent is 1,3,2,4-dibenzylidenesorbitol, 1,3,2,4-di(p-methylbenzylidene)sorbitol, 1,3,2,4-di(p-ethylbenzylidene) sorbitol, 1,3-p-chlorobenzylidene-2,4 methylbenzylidenesorbitol, 1,3,2,4-di(p-chlorobenzylidene) sorbitol or mixtures of two or more thereof.

15. The film according to claim 6 wherein:

the at least one polymer precursor in (a) is a 3-position branched α-olefin or a vinyl cycloalkane, each having at least 6 carbon atoms; $R^1$ in (d) is O, S or $C_{1-10}$ hydrocarbylene; $R^2$ and $R^3$ in (d) are independently H or $C_{1-10}$ hydrocarbyl; $R^4$ in (e) and $R^5$ in (f) are H or $C_{1-10}$ hydrocarbyl and/or the inorganic compound in (h) comprises talc.

* * * * *